United States Patent [19]

Kloss

[11] 3,874,342

[45] Apr. 1, 1975

[54] LIQUID SUPPLEMENT PUMP FOR SUCKLING ANIMAL FEEDER

[75] Inventor: Dale D. Kloss, Osseo, Minn.

[73] Assignee: K & K Manufacturing, Inc., Rogers, Minn.

[22] Filed: Nov. 23, 1973

[21] Appl. No.: 418,444

[52] U.S. Cl............ 119/71, 119/71 X, 119/51.11 X
[51] Int. Cl................................................. A01k 9/00
[58] Field of Search............ 119/71, 72, 51 R, 51.11

[56] References Cited
UNITED STATES PATENTS

| 3,208,431 | 9/1965 | Kloss................................ | 119/71 X |
| 3,498,311 | 3/1970 | Hawes, Jr. .................... | 119/51.11 X |

Primary Examiner—Hugh R. Chamblee
Attorney, Agent, or Firm—Merchant, Gould, Smith & Edell

[57] ABSTRACT

A supply container for liquid supplement and a pump for delivering a predetermined quantity of supplement to the mixing chamber of a suckling animal liquid food mixer and dispenser. The food mixer and dispenser involves a reservoir for dry granular food and mechanism for delivering a given charge of the food to the mixing chamber to be mixed with water and the liquid supplement. A valve controls delivery of the mixed food to a feeding nipple, and the valve and pump are operated by motors simultaneously.

3 Claims, 4 Drawing Figures

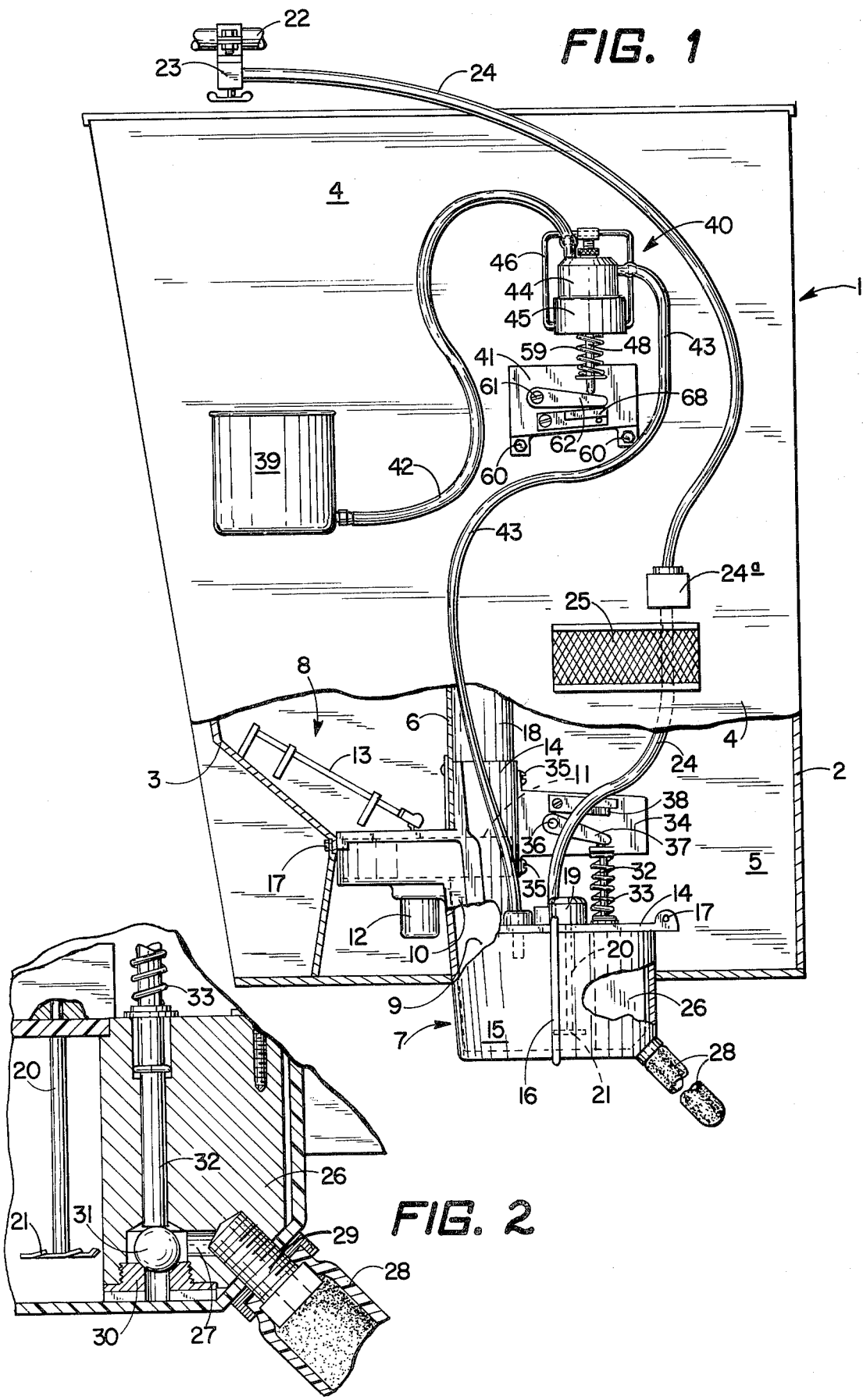

LIQUID SUPPLEMENT PUMP FOR SUCKLING ANIMAL FEEDER

BACKGROUND OF THE INVENTION

This invention is in the nature of an improvement over suckling animal food mixers and dispensers of the type disclosed in U.S. Pat. Nos. 3,037,481, 3,208,431, and 3,648,662, all assigned to the assignee of this invention.

It has been found that administering certain substances, such as vitamins, preventive or curative medicines, and the like, to suckling animals, can be achieved very easily by combining such substances with food intended for an animal, prior to feeding, and much more conveniently than by separate oral or subcutaneous injection, or by other means.

SUMMARY OF THE INVENTION

An important object of this invention is the provision of a suckling animal feeder which not only mixes dry, granular food with liquid and dispenses the same, but also includes mechanism for automatically adding a predetermined charge of liquid supplement to each batch of liquid food prepared by the feeder. To this and other ends, which will become apparent, I provide a feeder structure which involves a reservoir for dry granular food; a mixing chamber for reception of dry food from the reservoir; and liquid, such as water, to be mixed with the dry food to provide a liquid food; a feeding nipple secured to an outlet portion of the mixing chamber; a discharge valve controlling delivery of liquid food from the chamber to the nipple; a pump for delivering liquid supplement to the mixing chamber; and operating mechanism for the discharge valve and pump for closing the discharge valve and energizing the pump to cause delivery of the supplement to the mixing chamber.

BRIEF DESCRIPTION OF THE DRAWINGS

FIG. 1 is a view in side elevation of a suckling animal feeder, incorporating the liquid supplement feeding apparatus of this invention, some parts being broken away and some parts being shown in section;

FIG. 2 is an enlarged fragmentary view in section of a portion of FIG. 1;

DETAILED DESCRIPTION OF THE PREFERRED EMBODIMENT

Figure 3:
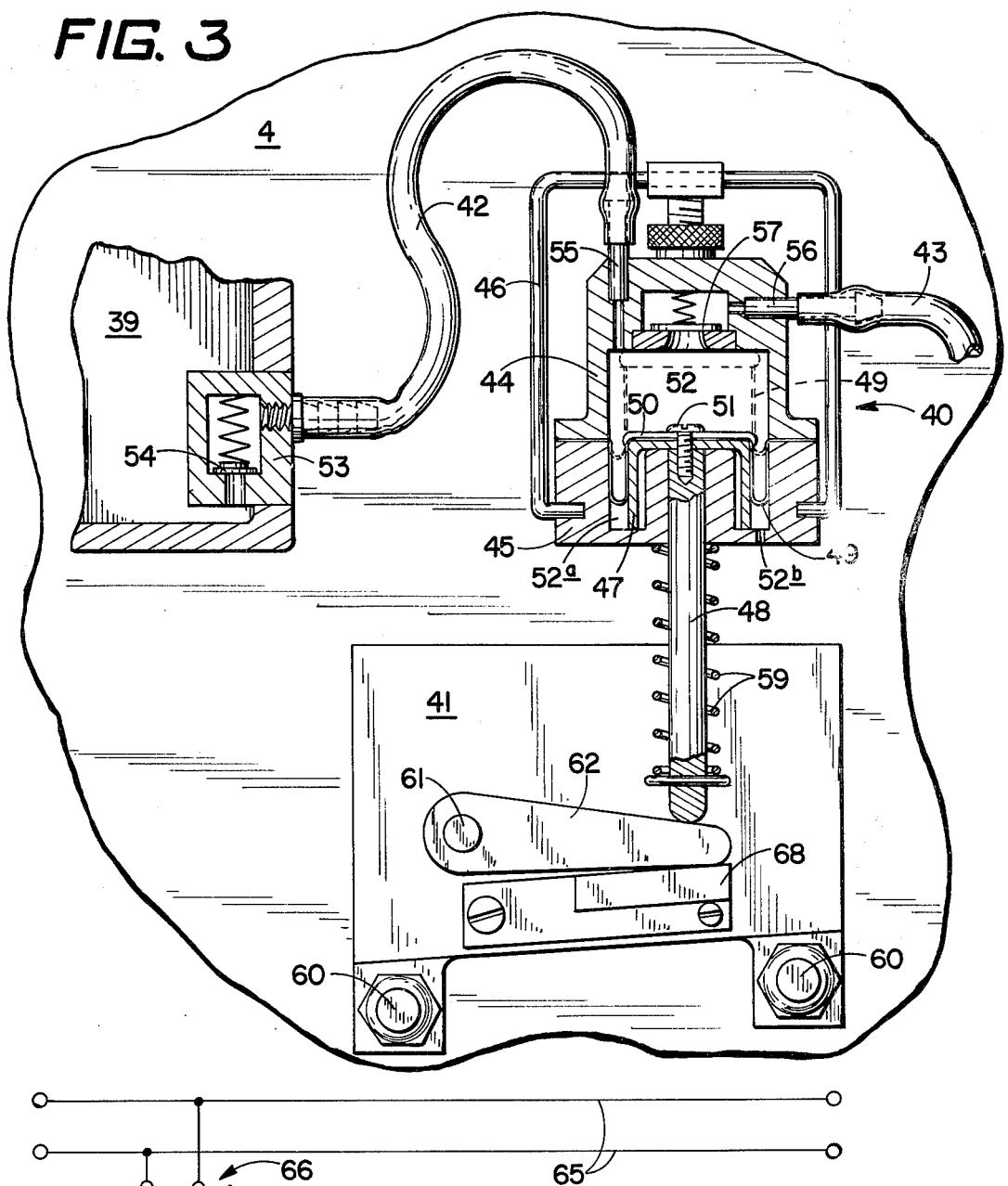
FIG. 3 is an enlarged fragmentary view of a portion of FIG. 1, some parts being broken away and some parts being shown in section.

In the drawings, a housing, indicated generally at 1, comprises front and rear walls 2 and 3 respectively, opposite side walls 4 and 5, and a vertically disposed partition 6 extending between the side walls 4 and 5. A casing 7 is mounted within the housing 1 adjacent the lower end thereof, and cooperates with the side walls 4 and 5, rear wall 3 and partition 6, to define a reservoir 8 for dry granular food. The casing 7 further defines a mixing chamber 9 that communicates with the reservoir 8 by means of a passageway 10 and a rotary metering device shown by dotted lines and indicated generally at 11, the metering device being operated by means of a motor 12. The motor 12 also operates an agitator 13 in the bottom portion of the reservoir 8.

The casing 7 comprises an upper support section 14 and a lower bowl section 15 that is removably secured to the upper section 14 by means of a bail 16. The upper section 14 is mounted in the housing 1 by means of screws 17 and defines the passageway 10, forming a support for a vent tube 18. The upper casing section 14 carries a motor 19 having a drive or agitator shaft 20 that extends downwardly into the mixing chamber 9 and which, at its lower end, is provided with an agitator blade or head 21, see particularly FIGS. 1 and 2. The agitator head 21 is adapted to thoroughly mix dry food dispensed to the mixing chamber 9 by the metering element 11, with suitable liquid, such as water, delivered to the mixing chamber 9 from a source of supply such as a water main 22 through a valve 23, and a conduit 24. Preferably, a water heater and control valve, not shown, may be assumed to be interposed in the conduit 24 within the housing 1. As shown in FIG. 1, the conduit 24 enters the housing 1 through a fitting 24a in the side wall 4. A screen 25 is placed over a ventilating opening in the side wall 4.

A valve body 26 is mounted within the chamber 9 and is formed to provide a discharge passage 27 at its bottom portion for discharge of liquid food from the mixing chamber 9 to a feeding nipple 28 that communicates with the discharge passage 27 by means of a hollow fitting 29 that extends through an opening in the bottom portion of the bowl section 15 and which is screw threaded into the valve body 26. A tubular valve seat element 30 is screw threaded into the bottom of the valve body 26, and supports a valve ball element 31, the valve ball element 31 being operative to permit passage of liquid food from the mixing chamber 9 to the nipple 28 but preventing return movement of liquid from the nipple 28 to the mixing chamber 9. The valve ball element 31 is releasably held in seating engagement with the valve seat element 30 by a check valve rod 32 mounted in the body 26 for axial movements toward and away from engagement with the valve ball element 31. A coil compression spring 33 urges the rod 32 upwardly away from engagement with the valve ball element 31. An electric motor 34 is mounted within the housing 1 on the upper casing section 14, by means of machine screws or the like 35, in overlying relationship to the mixing tank 20. The motor 34 has a drive shaft 36 on which is mounted a crank arm 37 that engages the upper end of the check valve rod 32 to move the rod 32 downwardly into closing engagement with the valve ball element 31 against bias of the spring 33. The motor 34 is a low torque induction motor, the torque thereof being only sufficient to move the valve ball element 31 into seating engagement with the valve seat element 30 against bias of the spring 33, thereafter stalling and remaining in a stalled condition while energized. This type of motor is readily available and can remain in an energized stalled condition for appreciable lengths of time without over-heating and becoming damaged. When the motor 34 is deenergized, the spring 33 moves the valve rod 32 upwardly away from the valve ball element 31, permitting the valve ball 31 to become unseated. Upward movement of the check valve rod 32 imparts limited reverse rotation to the drive shaft 36 of the motor 34 until the crank arm 37 engages a stop member 38 bolted or otherwise rigidly secured to the motor 34.

The above-described apparatus operates in a manner similar to the feeders of the above-identified U.S. patents, to prepare a batch or quantity of liquid food in the mixing chamber and to render the same available at the feeding nipple; after which a subsequent quantity or batch is prepared only when the preceding batch has been consumed by a suckling animal. This is accomplished by means of control circuitry including liquid level operated switches, motor operated timing switches, relays and the like. In view of the fact that these, in and of themselves, do not comprise the instant invention, detailed showing and description thereof is omitted, in the interest of brevity.

For the purpose of adding predetermined quantities or doses of liquid material to each batch of food in the mixing chamber, as a supplement, I provide a liquid supplement container 39, a pump 40, a motor 41 for operating the pump 40 and conduits 42 and 43, the former extending from the container 39 to the pump 40, and the latter extending from the pump 40 to the mixing chamber 9.

The pump 40 comprises upper and lower body members 44 and 45 respectively, releasably connected by a thumb screw equipped bail 46, a piston 47 mounted on one end of a piston rod 48 for axial reciprocatory movement in a cylindrical chamber defined by the body members 44 and 45, and a flexible diaphragm 49. The diaphragm 49 is commonly known as a rolling diaphragm, having its central portion secured to the top of the piston 47 by means of a cap 50 and screw 51. The screw 51 also secures the piston 47 to the piston rod 48. The marginal edge portion of the diaphragm 49 is anchored between the body members 44 and 45. The diaphragm 49 divides the chamber into pumping and vent compartments 52 and 52a respectively, the latter being vented to atmosphere, as indicated at 52b. The conduit 42 is connected to the container 39 by a fitting 53 having a spring pressed check valve element 54 therein, and to the pumping compartment 52 by an inlet fitting 55. The conduit 43 communicates with the pumping compartment 52 through a hose fitting 56 and a spring pressed check valve 57 suitably mounted in the pump body member 44. The check valve 54 permits liquid to be drawn into the pumping compartment 52 during downward movement of the piston 47, but prevents liquid from returning to the container 39 during upward movements of the piston 47. Similarly, the check valve 57 permits liquid to be discharged through the conduit 43 during upward movements of the piston 47, but prevents return of liquid to the compartment 52 from the conduit 43 during downward movement of the piston 47. Downward movements are imparted to the piston 47 by a coil compression spring 59.

The electric motor 41 is shown as being mounted on the side wall 4 by means of nut-equipped screws or the like 60, and includes a drive shaft 61 having mounted thereon a crank arm 62. The motor 41 may be assumed to be substantially identical with the motor 34, being an induction motor having characteristics which enable the same to be stalled over periods of time without over-heating or damage to the motor. The radially outer end portion of the crank arm 62 engages the lower end of the piston rod 48. The drive shaft 61 of the motor 41 is adapted to rotate in a counterclockwise direction with respect to FIGS. 1 and 3 to cause movement to be imparted to the piston 47 and diaphragm 49 in an upward direction against bias of the spring 59. Such upward movement of the piston 47 and diaphragm 49 causes liquid in the pumping compartment 52 to be discharged through the conduit 43 to the mixing chamber 9.

Figure 4:
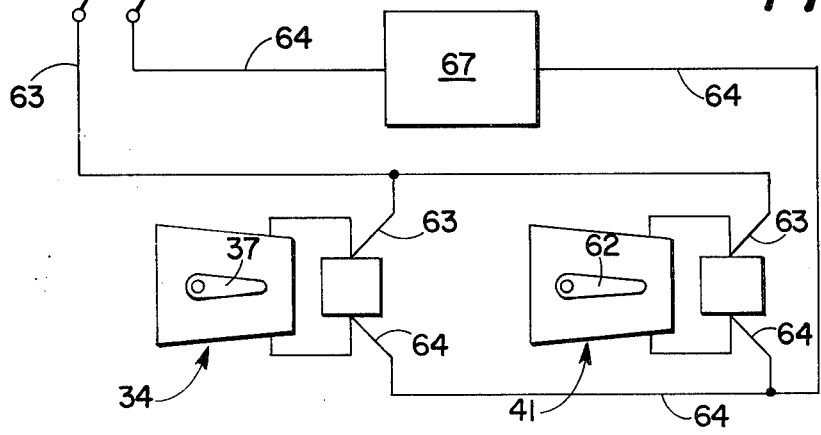
FIG. 4 is a wiring diagram.

The motors 34 and 41 are disposed in circuitry including leads 63 and 64 each of which is connected to one of a pair of power conductors 65, by means of a suitable switch 66. It will be noted that the motors 34 and 41 are disposed in parallel so that they are simultaneously energized and simultaneously deenergized. In the embodiment shown, other circuitry for controlling operation of the feeder, including switches, relays and timing devices, are interposed in the lead 64, these all being illustrated diagrammatically by the box 67 in the diagram of FIG. 4. It will be appreciated that the circuitry may be arranged so that the motor 41 may be deenergized earlier than the motor 34.

When the pump piston 47 is moved to the upper end of the pump chamber, responsive to energization of the motor 41, the piston is held in its raised position against bias of the spring 59 by the motor 41 until such time as the motor is deenergized. At that time, the spring 59 will move the piston 47 downwardly, causing the drive shaft 61 of the motor to rotate in the opposite direction until the crank arm 62 engages a stop element 68 similar to the stop element 38, and mounted on the motor 41. It should here be noted that, when the piston 47 reaches its limit of upward movement, the valve element 57 will move to its valve closed position. When the piston 47 moves downwardly, the valve element 54 will be opened due to suction within the pumping compartment 52, and liquid will be drawn from the container 39 to the pumping compartment 52. Thus, each time the motor 34 is energized to effect closing of the discharge passage 25 in the valve 26, at the beginning of a food mixing cycle, the motor 41 is also energized to cause a predetermined quantity of liquid supplement to be discharged into the mixing chamber 9 as an additive to the dry food material being dispensed to the chamber 9 by the metering element 11 and water delivered to the mixing chamber 9 through the conduit 24. As stated above, the liquid supplement may be of any desired type, such as food supplement, vitamins, or medication. The quantity of supplement liquid discharged to each batch of food can be regulated by positioning the stop element 68 relative to the pump body 44, as desired.

While I have shown and described a commercial embodiment of food supplement delivering mechanism, it will be understood that the same is capable of modification, without departure from the spirit and scope of the invention, as defined in the claims.

What is claimed is:

1. In a suckling animal feeder,
   a. a structure defining a reservoir for dry granular food and a mixing chamber having an outlet in its bottom portion;
   b. a feeding nipple secured to said outlet;
   c. means for delivering dry food and liquid to the mixing chamber and including,
      1. a supply container,
      2. a pump having a body defining a cylinder having a closed end and an opposite open end, said body including inlet and outlet passageways to the closed end of the cylinder, a piston axially movable in the cylinder, and yielding means urging the piston toward the open end of the cylinder,
      3. an inlet conduit extending from the supply container to said inlet passage.

4. a delivery conduit between said outlet passage and said mixing chamber,
5. and check valves in said inlet and delivery conduits;

e. a discharge valve controlling discharge of mixed food and supplement to said outlet;

f. and operating means for the discharge valve and for said mechanism including motor means for closing said discharge valve and causing delivery of said food supplement to the mixing chamber.

2. The suckling animal feeder defined in claim 1 in which said motor means includes a pair of motors each operatively associated with a different one of said check valve and said pump and each having a drive shaft, characterized by a crank arm secured to the drive shaft of one of said motors and extending radially therefrom, and a pitman element connected to said crank arm and said piston, said crank arm and pitman element being responsive to energization of their respective motor to move said piston toward the closed end of said cylinder against bias of said yielding means.

3. The suckling animal feeder defined in claim 2 in which said motors are disposed in an electric circuit for simultaneous operation to shut off discharge of food to the nipple and to move said piston in a direction to deliver a charge of liquid supplement to said mixing chamber.

* * * * *